US011523357B2

(12) United States Patent
Takeda et al.

(10) Patent No.: US 11,523,357 B2
(45) Date of Patent: Dec. 6, 2022

(54) SENSOR DATA PROCESSING SYSTEM AND SENSOR DATA SYNCHRONIZATION SYSTEM

(71) Applicant: SEIKO EPSON CORPORATION, Tokyo (JP)

(72) Inventors: Kazuyoshi Takeda, Chino (JP); Kazuma Aizawa, Ueda (JP)

(73) Assignee: SEIKO EPSON CORPORATION, Tokyo (JP)

( * ) Notice: Subject to any disclaimer, the term of this patent is extended or adjusted under 35 U.S.C. 154(b) by 43 days.

(21) Appl. No.: 16/667,017

(22) Filed: Oct. 29, 2019

(65) Prior Publication Data
US 2020/0137705 A1    Apr. 30, 2020

(30) Foreign Application Priority Data
Oct. 30, 2018    (JP) .............................. JP2018-203967

(51) Int. Cl.
*H04W 56/00*    (2009.01)
*H04W 84/18*    (2009.01)

(52) U.S. Cl.
CPC ........ *H04W 56/0015* (2013.01); *H04W 84/18* (2013.01)

(58) Field of Classification Search
CPC ........... H04W 56/0005; H04W 56/001; H04W 56/0015; H04W 56/003; H04W 56/004; H04W 56/0045; H04W 84/18; H04W 4/70; H04W 4/38; H04W 88/04; H04W 88/08; H04W 24/00; H04W 56/00; H04W 56/002; H04B 7/15507; H04B 7/2693
See application file for complete search history.

(56) References Cited

U.S. PATENT DOCUMENTS 8,023,443 B2 * 9/2011 Zakrzewski ........... G01D 21/00
                                                                370/311
8,050,881 B1 * 11/2011 Yeung .................. A61B 5/0024
                                                                702/89

(Continued)

FOREIGN PATENT DOCUMENTS

JP    2015-133596 A    7/2015

OTHER PUBLICATIONS

Mirabella et al., "Dynamic Continuous clock Synchronization for IEEE 802.15.4 based Sensor Networks," 2008 34th Annual Conference of IEEE Industrial Electronics, Orlando, FL, 2008, pp. 2438-2444 (Year: 2008).*

*Primary Examiner* — Un C Cho
*Assistant Examiner* — Lalita W Pace
(74) *Attorney, Agent, or Firm* — Oliff PLC (57) ABSTRACT

Provided is a sensor data processing system including: a plurality of sensor terminals, each including a sensor that outputs measurement data; a synchronization signal generation apparatus that simultaneously transmits a synchronization signal in a wireless manner to the plurality of sensor terminals through an access point; and a data processing apparatus that performs processing on the measurement data, in which, after synchronization that is based on the synchronization signal is established, each of the plurality of sensor terminals transmits the measurement data in a wireless manner to the data processing apparatus through the access point during a communication duration that is allocated in a mutually exclusive manner.

9 Claims, 7 Drawing Sheets

(56) References Cited

U.S. PATENT DOCUMENTS

| | | | | |
|---|---|---|---|---|
| 10,178,449 | B1* | 1/2019 | Struhsaker | H04Q 9/00 |
| 10,375,659 | B1* | 8/2019 | Ramlall | H04M 1/00 |
| 2003/0097432 | A1* | 5/2003 | Cagney | G06F 1/14 |
| | | | | 709/221 |
| 2010/0103878 | A1* | 4/2010 | Fujiwara | H04L 67/12 |
| | | | | 370/328 |
| 2011/0134906 | A1* | 6/2011 | Garudadri | H04J 3/0658 |
| | | | | 370/350 |
| 2011/0216658 | A1* | 9/2011 | Etkin | H04L 43/00 |
| | | | | 370/242 |
| 2014/0122958 | A1* | 5/2014 | Greenebrg | A61B 5/112 |
| | | | | 714/748 |
| 2014/0149560 | A1* | 5/2014 | Hakami | H04L 67/1095 |
| | | | | 709/221 |
| 2014/0226648 | A1* | 8/2014 | Xing | H04W 56/009 |
| | | | | 370/350 |
| 2014/0301513 | A1* | 10/2014 | Takahashi | H04J 3/0697 |
| | | | | 375/354 |
| 2015/0346760 | A1* | 12/2015 | Kishiro | H04J 3/0661 |
| | | | | 713/503 |
| 2015/0358933 | A1* | 12/2015 | Yamamoto | H04W 4/70 |
| | | | | 370/329 |
| 2016/0150491 | A1* | 5/2016 | Barrett | H04L 67/12 |
| | | | | 370/350 |
| 2017/0099586 | A1* | 4/2017 | Corbin | H04W 4/08 |
| 2018/0184390 | A1* | 6/2018 | Wu | H04L 27/2692 |
| 2018/0295535 | A1* | 10/2018 | Kavars | G06F 1/28 |
| 2019/0037336 | A1* | 1/2019 | Yang | G08B 1/08 |
| 2019/0132071 | A1* | 5/2019 | Matsunaga | H04L 69/28 |
| 2019/0230075 | A1* | 7/2019 | Neild | H04W 84/18 |
| 2020/0191623 | A1* | 6/2020 | Li | G08C 17/02 |

* cited by examiner

SENSOR DATA PROCESSING SYSTEM AND SENSOR DATA SYNCHRONIZATION SYSTEM

The present application is based on, and claims priority from JP Application Serial Number 2018-203967, filed Oct. 30, 2018, the disclosure of which is hereby incorporated by reference herein in its entirety.

BACKGROUND

1. Technical Field

The present disclosure relates to a sensor data processing system and a sensor data synchronization system.

2. Related Art

Recent years, various systems in which a data processing apparatus processes pieces of data detected by multiple sensor terminals and provides desired information have come into wide use. Because there is a shift in time information that is retained by each of the multiple sensor terminals, there is a need to synchronize a time between each of the multiple sensor terminals before the data processing apparatus processes data.

In JP-A-2015-133596, a wireless communication system is disclosed in which a hub and multiple sensor nodes are capable of first short-distance wireless communication for data transmission and reception and of second short-distance wireless communication for transmission and reception of a synchronization signal for time synchronization, which complies with a communication scheme different from that for the first short-distance wireless communication. In the system, when transmitting the synchronization signal, the hub converts a standard time within the hub itself into time information that is used by the second short-distance wireless communication, and transmits the resulting time information to the sensor node using the second short-distance wireless communication. The sensor node performs inverse transform to convert the received synchronization signal to the time information in compliance with a standard time within the sensor node itself. Then, at the time of the transmission and reception to and from the hub, the sensor node performs data communication, based on a time that results from converting a time obtained from the standard time into time information that is used for the first short-distance wireless communication. Accordingly, the times of the hub and the multiple sensor nodes can be synchronized with each other.

However, the problem with the system disclosed in JP-A-2015-133596 is that the cost for necessitating communication scheme for time synchronization is difficult to reduce.

SUMMARY

A sensor data processing system according to an aspect of the present disclosure includes: a plurality of sensor terminals, each including a sensor that outputs measurement data; a synchronization signal generation apparatus that simultaneously transmits a synchronization signal in a wireless manner to the plurality of sensor terminals through an access point; and a data processing apparatus that performs processing on the measurement data, in which, after synchronization that is based on the synchronization signal is established, each of the plurality of sensor terminals transmits the measurement data in a wireless manner to the data processing apparatus through the access point during a communication duration that is allocated in a mutually exclusive manner.

In the sensor data processing system of the aspect, each of the plurality of sensor terminals may transmit the measurement data to which an acquisition time is added, to the data processing apparatus during the communication duration.

In the sensor data processing system of the aspect, the synchronization signal may include first time information in compliance with a first time standard, the synchronization signal generation apparatus may also transmit the synchronization signal to the data processing apparatus through the access point, and the data processing apparatus may acquire second time information in compliance with a second time standard from a time server through a communication network, and, based on the first time information and the second time information, may convert a time at which the measurement data is acquired, into a time in compliance with the second time standard.

In the sensor data processing system of the aspect, the synchronization signal generation apparatus may transmit the synchronization signal multiple times with a fixed periodicity to the plurality of sensor terminals, and when a reception interval of the synchronization signal falls successively multiple times within a specified range, each of the plurality of sensor terminals may determine that the synchronization is established.

The sensor data processing system of the aspect may further include the access point.

In the sensor data processing system of the aspect, the sensor terminal may include a data acquisition section that acquires the measurement data from the sensor, and the sensor terminal may correct a timing at which the data acquisition section acquires the measurement data, based on a timing at which the synchronization signal is received.

In the sensor data processing system of the aspect, the sensor may be an inertial sensor.

A sensor data synchronization system according to an aspect of the present disclosure includes: a plurality of sensor terminals, each including a sensor that outputs measurement data; a synchronization signal generation apparatus that simultaneously transmits a synchronization signal in a wireless manner to the plurality of sensor terminals through an access point; and in which, after synchronization that is based on the synchronization signal is established, each of the plurality of sensor terminals transmits the measurement data in a wireless manner to a data processing apparatus through the access point during a communication duration that is allocated in a mutually exclusive manner.

In the sensor data synchronization system of the aspect, the synchronization signal generation apparatus may transmit the synchronization signal multiple times with a fixed periodicity to the plurality of sensor terminals, and when a reception interval of the synchronization signal falls successively multiple times within a specified range, each of the plurality of sensor terminals may determine that the synchronization is established.

In the sensor data synchronization system of the aspect, the sensor may be an inertial sensor.

DESCRIPTION OF EXEMPLARY EMBODIMENTS

Suitable embodiments of the present disclosure will be described in detail below with reference to the drawings. It is noted that the embodiments which will be described below do not unreasonably impose any limitation on a subject matter described according to an aspect of the present disclosure. Furthermore, all configurations that will be described below are not limited to being essential requirements for the present disclosure.

1. Configuration of a Sensor Data Processing System

Figure 1:
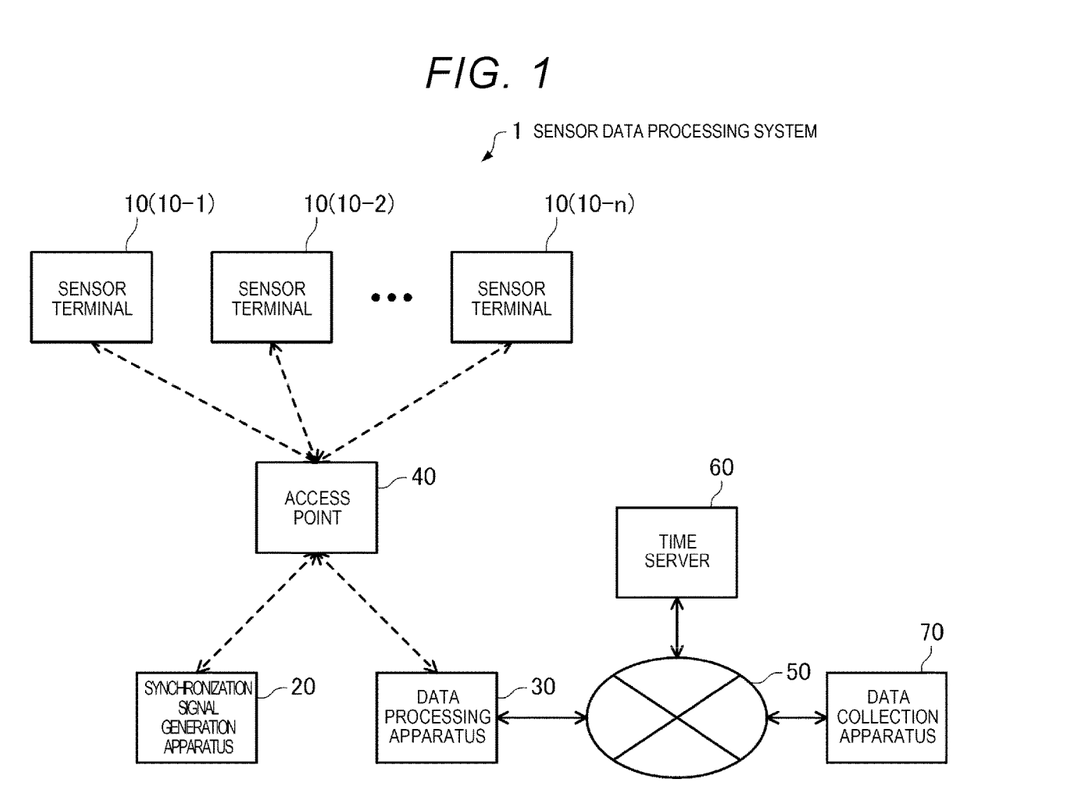
FIG. 1 is a diagram illustrating a configuration of a sensor data processing system according to the present embodiment.

FIG. 1 is a diagram illustrating a configuration of a sensor data processing system 1 according to the present embodiment. As illustrated in FIG. 1, the sensor data processing system 1 according to the present embodiment includes multiple sensor terminals 10, a synchronization signal generation apparatus 20, and a data processing apparatus 30. Furthermore, the sensor data processing system 1 according to the present embodiment may include an access point 40. In a case where the number of sensor terminals 10 is assumed to be n and where n sensor terminals 10 are distinguished from each other, they will be described below as sensor terminals 10-1, 10-2, and so forth up to 10-$n$, respectively. It is noted that n is an integer that is equal to or greater than 2.

As illustrated in FIG. 1, in the sensor data processing system 1, a star-topology wireless local area network (LAN) is established over which the n sensor terminals 10, the synchronization signal generation apparatus 20, and the data processing apparatus 30 communicate with each other with the access point 40 as a repeater. IEEE 802.11 series is taken as an example of a communication standard for the wireless LAN. In the present embodiment, the n sensor terminals 10, the synchronization signal generation apparatus 20, and the data processing apparatus 30 perform communication in compliance with a signal communication standard through the access point 40.

The synchronization signal generation apparatus 20 simultaneously transmits a synchronization signal in a wireless manner to the n sensor terminals 10 through the access point 40. Furthermore, the synchronization signal generation apparatus 20 also transmits the synchronization signal to the data processing apparatus 30 through the access point 40. That is, the synchronization signal generation apparatus 20 simultaneously transmits the synchronization signal to the n sensor terminals 10 and the data processing apparatus 30 through the access point 40. The synchronization signal generation apparatus 20 generates first time information in compliance with a first time standard, and the synchronization signal includes the first time information. The first time standard is the internal time of the synchronization signal generation apparatus 20, that is, a time standard of a local time.

Each of the n sensor terminals 10 is attached to a structure. Each of then sensor terminals 10 includes a sensor that outputs measurement data, which is not illustrated, and acquires the measurement data from the sensor. The sensor may be an inertial sensor.

Each of the n sensor terminals 10 receives the synchronization signal through the access point 40. Each of the n sensor terminals 10 determines whether or not synchronization that is based on the synchronization signal is established, during a synchronization determination duration that comes periodically, and, when the synchronization is established, corrects a timing at which the measurement data is acquired from the sensor, based on a timing at which the synchronization signal is received.

After the synchronization that is based on the synchronization signal is established, each of the n sensor terminals 10 transmits the measurement data to which an acquisition time is added, in a wireless manner to the data processing apparatus 30 through the access point 40 during a communication duration that is allocated in a mutually exclusive manner. Specifically, each of the n sensor terminals 10 transmits the measurement data in a transmission slot with a number that corresponds one by one to its identification code which is exclusively allocated. It is noted that an identification code of the sensor terminal 10 is also added to the measurement data.

Figure 2:
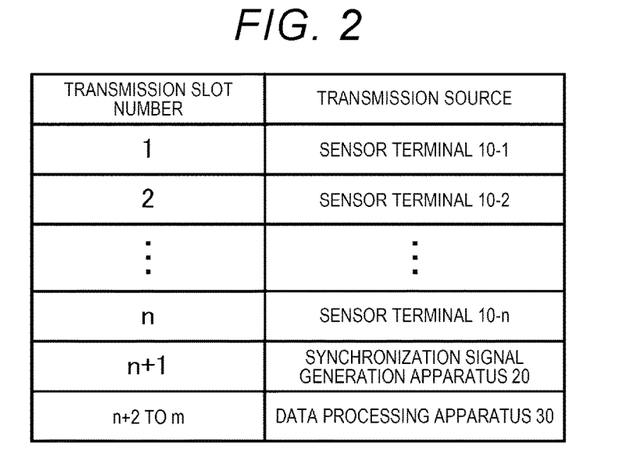
FIG. 2 is a diagram illustrating an example of a transmission slot.

FIG. 2 is a diagram illustrating an example of the transmission slot. In the example in FIG. 2, m transmission slots that are numbered from 1 to m are defined, and the m transmission slots are the same in time. It is possible that the sensor terminals 10-1 to 10-$n$ transmit the measurement data only in transmission slots that are numbered from 1 to n. It is noted that it is possible that the synchronization signal generation apparatus 20 transmits the synchronization signal only in a transmission slot numbered n+1 and that it is possible that the data processing apparatus 30 transmits various commands or the like in transmission slots that are numbered from n+2 to m. In this manner, the n sensor terminals 10, the synchronization signal generation apparatus 20, and the data processing apparatus 30 perform transmission in transmission slots different from each other, and thus can perform communication in compliance with a single communication standard.

With reference again to FIG. 1, the data processing apparatus 30 receives measurement data from each of the n sensor terminals 10 through the access point 40, and performs on the measurement data. The data processing apparatus 30 can specify which measurement data is the measurement data that is transmitted from the sensor terminal 10, from the identification code that is added to the received measurement data. Then, by the processing on the measurement data, a value of a prescribed index, to which a time at which the measurement data is acquired is added, is obtained. Furthermore, the data processing apparatus 30 receives the synchronization signal that includes the first time information, through the access point 40. Then, the data processing apparatus 30 acquires second time information in compliance with a second time standard from a time server 60 through a communication network such as the Internet, and, based on the first time information and the second time information, converts the time at which the measurement data used for calculation of the value of the index obtained by processing the measurement data is acquired, into a time in compliance with the second time standard. For example, the second time standard may be a time standard of a global time such as a world standard time. The data processing apparatus 30 may transmit index information that includes a time in compliance with the second time standard, to a data collection apparatus 70 through the communication network 50.

It is noted that synchronization signal generation apparatus 20 simultaneously transmits the synchronization signal, and thus pieces of measurement data of the n sensor terminals 10 can be synchronized. Because of this, a sensor data synchronization system is established that includes the synchronization signal generation apparatus 20 and the n sensor terminals 10.

Figure 3:
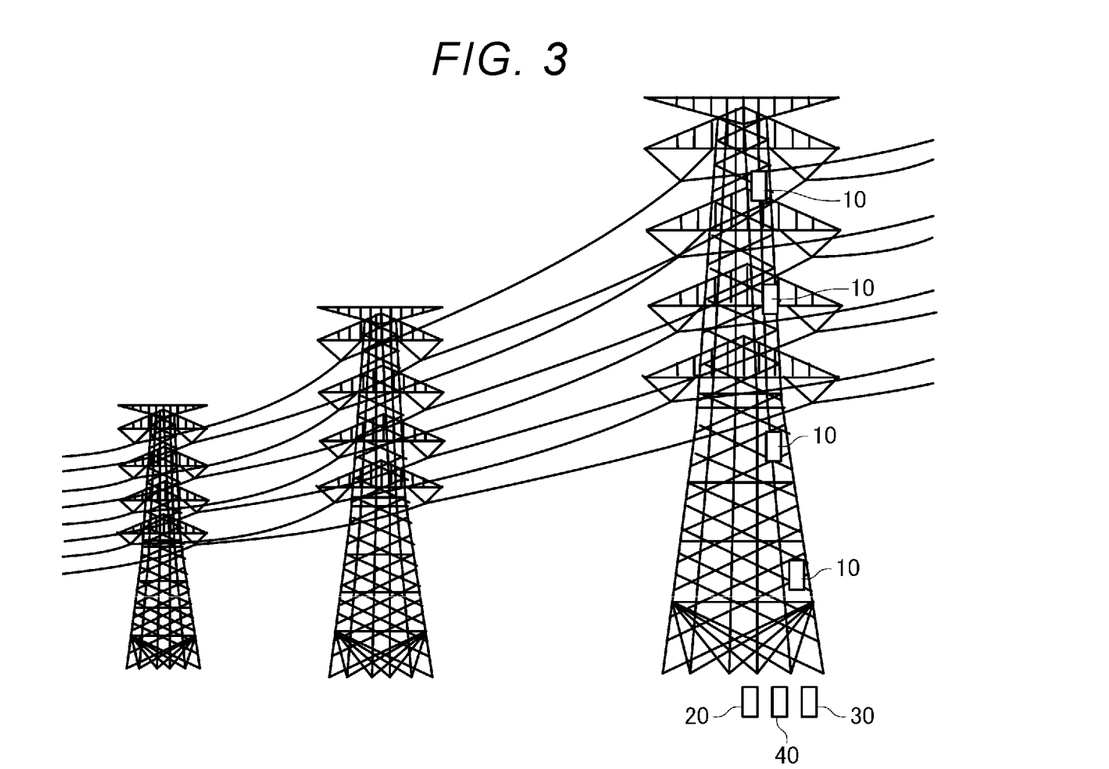
FIG. 3 is a diagram illustrating an example where a sensor terminal, a synchronization signal generation apparatus, a data processing apparatus, and an access point are installed.

FIG. 3 is a diagram illustrating an example where the sensor terminal 10, the synchronization signal generation apparatus 20, the data processing apparatus 30, and the access point 40 are installed. In an example in FIG. 3, multiple sensor terminals 10 are installed in positions, respectively, that are different in altitude from each other at an electricity transmission line steel tower supporting an electricity transmission line. Furthermore, the synchronization signal generation apparatus 20, the data processing apparatus 30, and the access point 40 are installed on the ground surface or the like that is close to the electricity transmission steel tower. The synchronization signal generation apparatus 20, the data processing apparatus 30, and the access point 40 are close to each other, and a distance between the access point 40 and each sensor terminal 10 is in the range where a radio wave is received. For example, based on the measurement data from each sensor terminal 10, the data processing apparatus 30 can calculate an amount of displacement, an amount of twist, the degree of swinging, and the like that occur in each portion of the electricity transmission steel tower. It is noted that although omitted from illustration in FIG. 3, the sensor terminal 10, the data processing apparatus 30, and the access point 40 may also be provided in two electricity transmission steel towers that are present in the backward direction, in the same manner as in the electricity transmission steel tower ahead of them.

Figure 4:
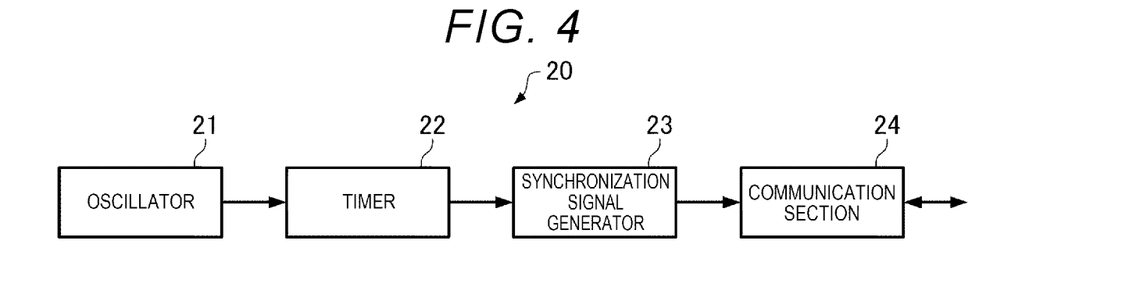
FIG. 4 is a diagram illustrating an example of a functional block of the synchronization signal generation apparatus.

2. Configurations of the Synchronization Signal Apparatus, the Sensor Terminal, and the Data Processing Apparatus FIG. 4 is a diagram illustrating an example of a functional block of the synchronization signal generation apparatus 20. As illustrated in FIG. 4, the synchronization signal generation apparatus 20 includes an oscillator 21, a timer 22, a synchronization signal generator 23, and a communication section 24.

The oscillator 21 generates an oscillation signal and outputs and the oscillation signal to the timer 22. Based on the oscillation signal, the timer 22 makes an update of a value each time a prescribed time elapses. The high accuracy is desirable because a value of the timer 22 is the first time information in compliance with the first time standard. Therefore, for example, the oscillator 21 may be a temperature-compensated crystal oscillator that provides high frequency accuracy.

The synchronization signal generator 23 generates the synchronization signal each time the update of the value of the timer 22 is made a prescribed number of times, and transmits the generated synchronization signal to the access point 40 through the communication section 24. For example, the synchronization signal may include the value of the timer 22, as the first time information and may be a synchronization packet in which the n sensor terminals 10 and the data processing apparatus 30 are designated as transmission destinations.

Figure 5:
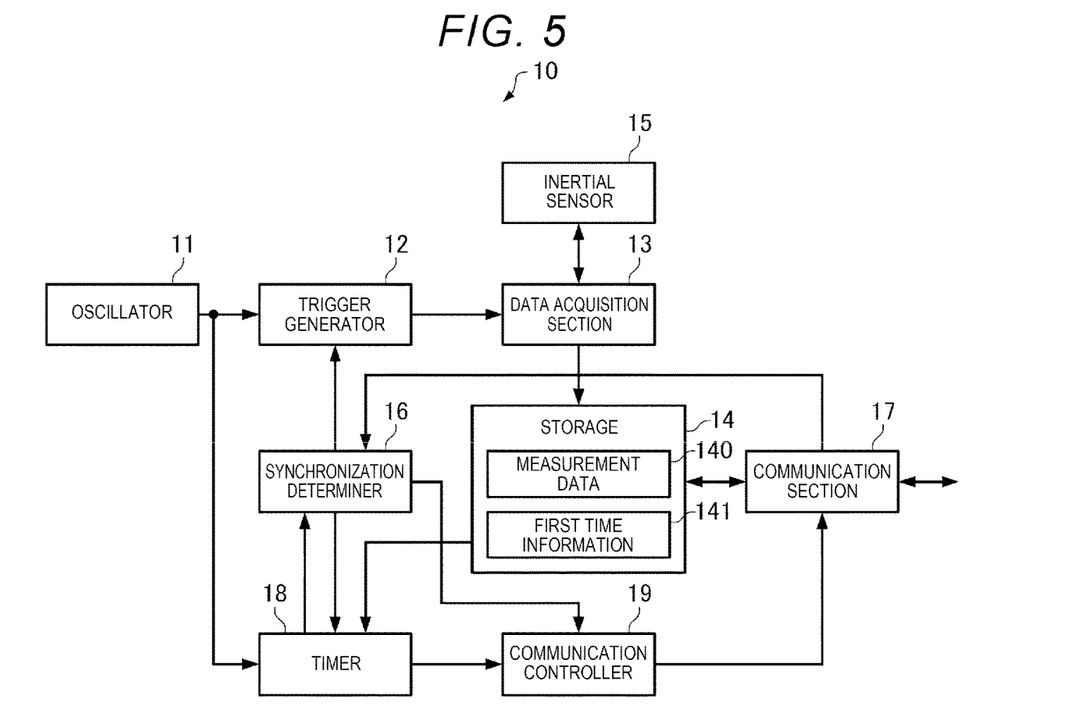
FIG. 5 is a diagram illustrating an example of a functional block of the sensor terminal.

FIG. 5 is a diagram illustrating an example of a functional block of the sensor terminal 10. As illustrated in FIG. 5, the sensor terminal 10 includes an oscillator 11, a trigger generator 12, a data acquisition section 13, a storage 14, an inertial sensor 15, a synchronization determiner 16, a communication section 17, a timer 18, and a communication controller 19.

The oscillator 11 generates an oscillation signal and outputs the oscillation signal to the trigger generator 12 and the timer 18. The trigger generator 12 generates a trigger signal each time a prescribed time elapses, based on the oscillation signal, and outputs the trigger signal and a time at which the trigger signal occurs, to the data acquisition section 13.

The inertial sensor 15 outputs the measurement data. Then, the data acquisition section 13 acquires the measurement data from the inertial sensor 15, and stores the measurement data 140 to which the time at which the trigger signal occurs, a time at which the measurement data is acquired, is added, in the storage 14. The inertial sensor 15 may be an acceleration sensor and may be an angular speed sensor. Alternatively, the inertial sensor 15 may be an inertial measurement unit (IMU) that includes the acceleration sensor and the angular speed sensor.

The timer 18 makes an update of the value each time a prescribed time elapses, based on the oscillation signal. The communication controller 19 controls operation of the communication section 17. Specifically, the communication controller 19 performs control in such a manner that the communication section 17 receives the synchronization signal. Furthermore, the communication controller 19 determines whether or not its transmission slot arrives, based on a timer value of the timer 18, and performs control in such a manner that the communication section 17 transmits the measurement data to which the identification code of the sensor terminal 10 is added, in the transmission slot.

The communication section 17 performs communication with the synchronization signal generation apparatus 20 and the data processing apparatus 30 through the access point 40, under the control of the communication controller 19. Specifically, the communication section 17 receives the synchronization signal from the synchronization signal generation apparatus 20 and stored first time information 141 that is included in the synchronization signal, in the storage 14. Furthermore, the communication section 17 adds the identification code of the sensor terminal 10 to the measurement data 140 that is stored in the storage 14, and transmits the measurement data to which the identification code is added, to the data processing apparatus 30. Furthermore, the communication section 17 may receive various commands from the data processing apparatus 30 and store setting information in accordance with the command, in the storage 14. For example, the data acquisition section 13 determines a periodicity with which the measurement data is acquired from the inertial sensor 15, or the like, according to the setting information that is stored in the storage 14. Furthermore, the communication section 17 may retransmit the measurement data 140 that is previously transmitted, in its transmission slot, according to the command.

The synchronization determiner 16 measures a time based on the timer value of the timer 18, and determines whether or not the synchronization is established, based on the synchronization signal received by the communication section 17, each time a prescribed time elapses. Then, when it is determined that the synchronization is established, the synchronization determiner 16 corrects a timing at which a trigger occurs by the trigger generator 12 and an update timing of the timer value of the timer 18, based on a reception timing of the synchronization signal. It is noted that the synchronization determiner 16 performs synchronization determination processing until the synchronization is established, and, when the synchronization is established, ends the synchronization determination processing. Therefore, a synchronization determination duration each time a prescribed time elapses and ends the synchronization determination duration when the synchronization is established. The communication controller 19 cannot correctly specify a starting timing of the transmission slot, because the synchronization is not established during the synchronization determination duration, and, because of this, performs control in such a manner that the communication section 17 does not transmit the measurement data 140. Accordingly, a situation is avoided where the measurement data 140 that is transmitted from the communication section 17 collides with the measurement data that is transmitted by any other sensor terminal 10.

In the present embodiment, the synchronization signal generation apparatus 20 periodically transmits the synchronization signal to the n sensor terminals 10 through the access point 40. Therefore, the time it takes each of the n sensor terminals 10 to receive the synchronization signal after the synchronization signal generation apparatus 20 transmits the synchronization signal varies with dispersion in a delay time in the access point 40 each time. In some cases, the delay time in the access point 40 can be instantly longer than a periodicity with which each of the n sensor terminals 10 acquires the measurement data. When this is done, if, based on a timing at which the synchronization signal is received one time during the synchronization determination duration, each of the n sensor terminals 10 corrects the timing at which the measurement data is acquired or the update timing of the timer value of the timer 18, in some cases, the timing at which the measurement data is acquired or the transmission slot can be shifted.

Thus, in the present embodiment, when a reception interval of the synchronization signal falls successively multiple times within a specified range, the synchronization determiner 16 determines that the synchronization is established. In a case where a periodicity with which the synchronization signal generation apparatus 20 transmits the synchronization signal is defined as T, the specified range, for example, may be a range from T−Δt to T+Δt. At this point, Δt is set to be a time that is shorter than the periodicity with which the sensor terminal 10 acquires the measurement data. For example, the periodicity with which the sensor terminal 10 acquires the measurement data may be 2 ms and Δt may be 0.1 ms. For example, when the reception interval of the synchronization signal falls successively three times within the specified range, the synchronization determiner 16 may determine that the synchronization is established. Accordingly, when the synchronization signal is successively four times received, only when the dispersion in the delay time in the access point 40 is low, the synchronization is established. Therefore, when the delay time in the access point 40 is instantly considerably long, the reception interval of the synchronization signal is out of the specified range before and after the delay time is instantly considerably long. Because of this, the synchronization is not established and a concern that the time at which the measurement data is acquired or the transmission slot will be shifted is reduced.

It is noted that consumption of electric current is reduced and the because of this, the synchronization determination processing by the synchronization determiner 16 is performed each time a prescribed time, for example, 10 minutes elapses. Conversely, because the synchronization has to be maintained for approximately 10 minutes after the synchronization is established, the oscillator 21 may be an oscillator that provides high frequency precision and, for example, may be a temperature-compensated crystal oscillator.

Figure 6:
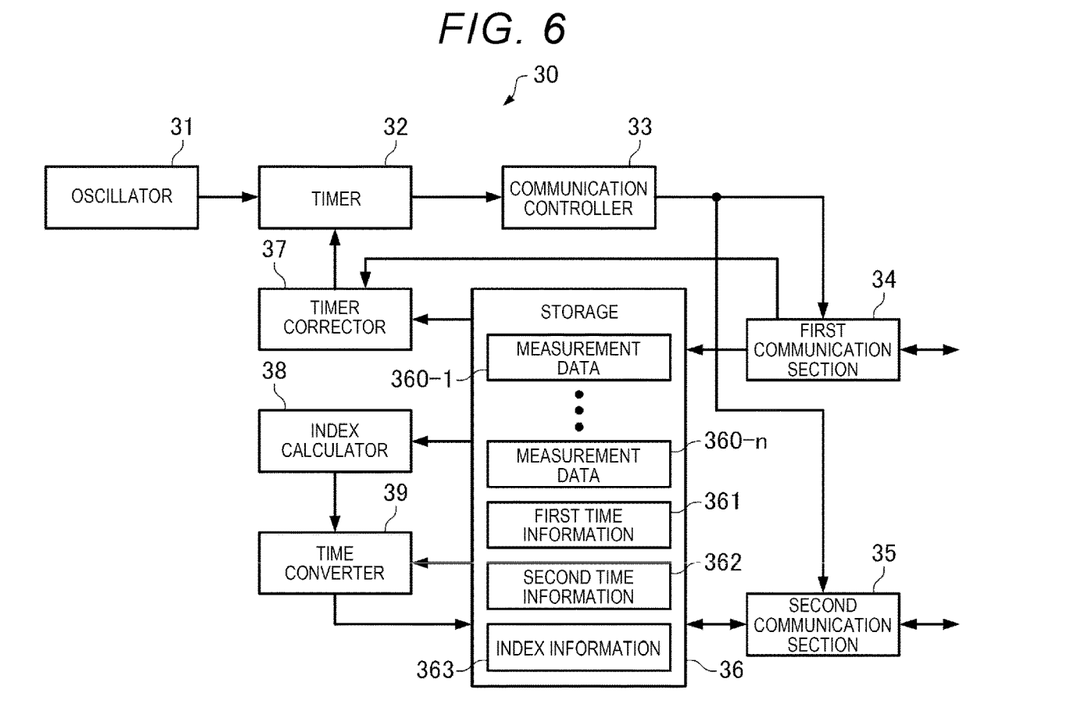
FIG. 6 is a diagram illustrating an example of a functional block of the data processing apparatus.

FIG. 6 is a diagram illustrating an example of a functional block of the data processing apparatus 30. As illustrated in FIG. 6, the data processing apparatus 30 includes an oscillator 31, a timer 32, a communication controller 33, a first communication section 34, a second communication section 35, a storage 36, a timer corrector 37, an index calculator 38, and a time converter 39.

The oscillator 31 generates an oscillation signal and outputs the oscillation signal to the timer 32. Based on the oscillation signal, the timer 32 makes an update of the value each time a prescribed time elapses. The timer corrector 37 corrects the update timing of the timer value of the timer 32 based on the reception timing of the synchronization signal, each time the first communication section 34 receives the synchronization signal.

The communication controller 33 controls operation of each of the first communication section 34 and the second communication section 35. Specifically, the communication controller 33 performs control in such a manner that the first communication section 34 receives the synchronization signal. Furthermore, the communication controller 33 determines whether or not the transmission slot of each of the n sensor terminals 10 arrives, based on the value of the timer 32, and performs control in such a manner that the first communication section 34 receives the measurement data from each of the n sensor terminals 10. Furthermore, the communication controller 33 determines whether or not its transmission slot arrives, based on the timer value of the timer 32 and performs control in such a manner that the first communication section 34 transmits various commands in its transmission slot, whenever necessary. The command, for example, is a command that makes a request to at least one of the n sensor terminals 10 for the setting of the periodicity or the like with which the measurement data is acquired, a command that makes a request to at least one of the n sensor terminals 10 for the retransmission of the measurement data, or the like. Furthermore, the communication controller 33 performs control in such a manner that the second communication section 35 periodically receives the second time information from the time server 60. Furthermore, the communication controller 33 performs control in such a manner that the second communication section 35 transmits the index information to the data collection apparatus 70 according to the request from the data collection apparatus 70.

The first communication section 34 performs communication with the synchronization signal generation apparatus 20 and the n sensor terminals 10, through the access point 40, under the control of the communication controller 33. Specifically, the first communication section 34 receives synchronization signal from the synchronization signal generation apparatus 20 and stores first time information 361, which is included in the synchronization signal, in the storage 36. Furthermore, the first communication section 34 receives pieces of measurement data 360-1 to 360-$n$ from the n sensor terminals 10, respectively, and stores the pieces of measurement data 360-1 to 360-$n$ in the storage 36. The first communication section 34 can specify which one of the pieces of measurement data 360-1 to 360-$n$ is the measurement data, from the identification code that is added to the received measurement data. Furthermore, the first communication section 34 transmits various commands to the n sensor terminals 10.

The second communication section 35 performs communication with the time server 60 and the data collection apparatus 70, through the communication network 50, under the control of the communication controller 33. Specifically, the second communication section 35 receives second time information 362 from the time server 60 and stores the second time information 362 in the storage 36. Furthermore, the second communication section 35 transmits the index information 363 that is stored in the storage 14, to the data collection apparatus 70.

The index calculator 38 performs a prescribed arithmetic operation on the pieces of measurement data 360-1 to 360-$n$ that have the same acquisition time, and calculates a value of a prescribed index at the time. The index, for example, may be an amount of displacement, an amount of twist, the degree of swinging, and the like that occur in a structure to which that the n sensor terminals 10 are attached.

The time converter 39 converts the times at which the pieces of measurement data 360-1 to 360-$n$, which are used by the index calculator 38 for the calculation of the value of the index, are acquired, into the time in compliance with the second time standard, based on the first time information 361 and the second time information 362 that are stored in the storage 36, and stores the index information 363 that includes the value of the index and the time in compliance with the second time standard, in the storage 36.

It is noted that the timer value of the timer 32 is corrected each time the first communication section 34 receives the synchronization signal, and that because of this, the oscillator 31 may be an oscillator that provides lower frequency accuracy than the oscillator 11 or the oscillator 21, for example, a CR oscillator. Accordingly, the low cost of the data processing apparatus 30 or low power consumption is achieved.

3. Time Chart

Figure 7:
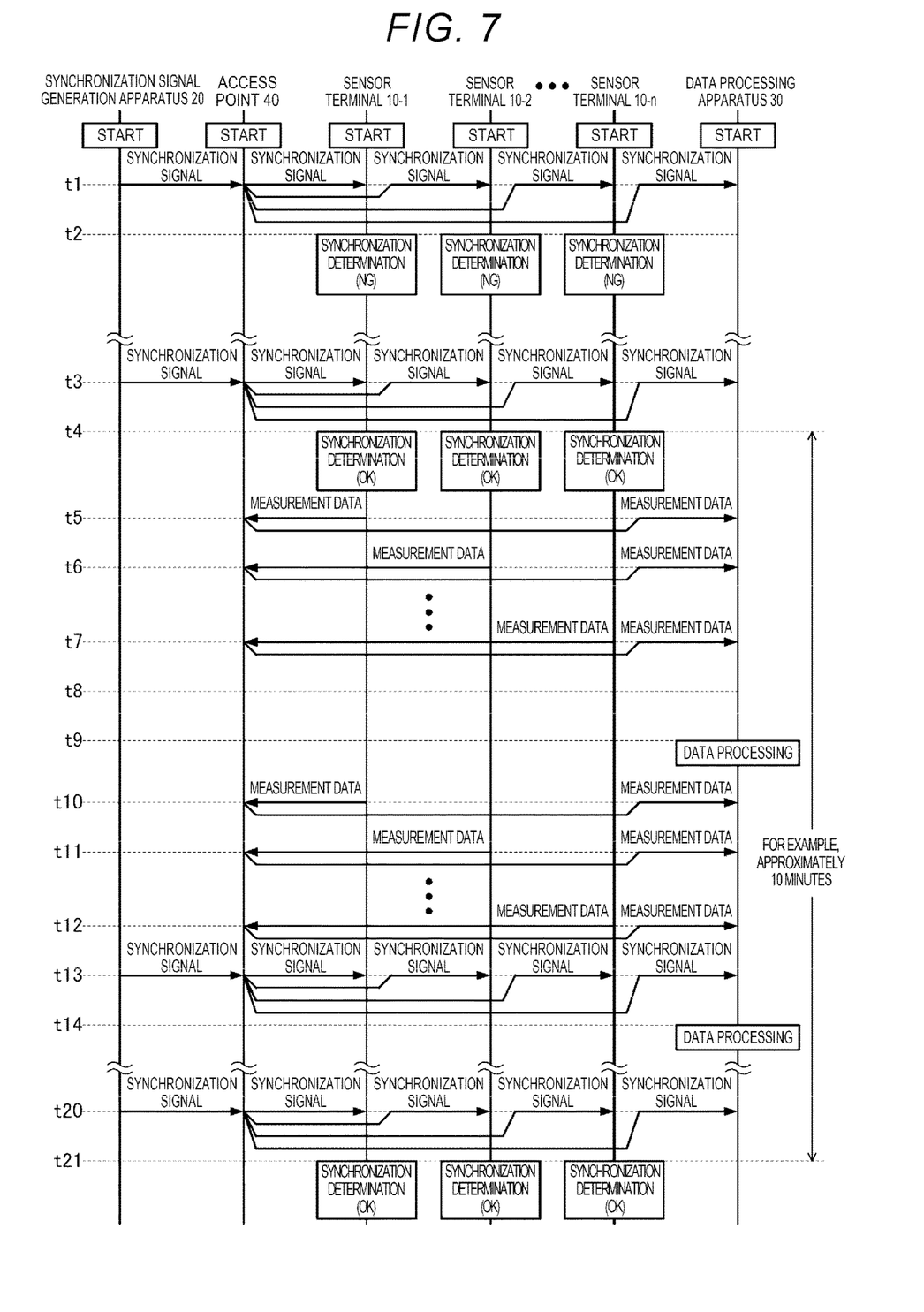
FIG. 7 is a diagram illustrating an example of a time chart of operation of each of the synchronization signal generation apparatus and the data processing apparatus.

FIG. 7 is a diagram illustrating an example of a time chart of operation of each of the sensor terminals 10-1 to 10-$n$, and an example of a time chart of operation of each of the synchronization signal generation apparatus 20 and the data processing apparatus 30.

In the example in FIG. 7, first, at time t1, the synchronization signal generation apparatus 20 simultaneously transmits the synchronization signal to the sensor terminals 10-1 to 10-$n$ and the data processing apparatus 30 through the access point 40. Then, the sensor terminals 10-1 to 10-$n$ and the data processing apparatus 30 receive the synchronization signal.

Next, in time t2, the sensor terminals 10-1 to 10-$n$ perform the synchronization determination processing and determines that the synchronization is not established.

Thereafter, at time t3, the synchronization signal generation apparatus 20 simultaneously transmits the synchronization signal to the sensor terminals 10-1 to 10-$n$ and the data processing apparatus 30 through the access point 40. Then, the sensor terminals 10-1 to 10-$n$ and the data processing apparatus 30 receive the synchronization signal.

Next, in time t4, the sensor terminals 10-1 to 10-$n$ perform the synchronization determination processing and determines that the synchronization is established. Accordingly, the synchronization determination duration ends, the time synchronization is established between the synchronization signal generation apparatus 20 and each of the sensor terminals 10-1 to 10-$n$, and thus the sensor terminals 10-1 to 10-$n$ can specify their respective transmission slots.

Next, at time t5 that is included in its transmission slot, the sensor terminal 10-1 transmits the measurement data to the data processing apparatus 30 through the access point 40. The data processing apparatus 30 receives the measurement data.

Next, at time t6 that is included in its transmission slot, the sensor terminal 10-2 transmits the measurement data to the data processing apparatus 30 through the access point 40. The data processing apparatus 30 receives the measurement data.

Thereafter, in the same manner, the sensor terminal 10-3 to the sensor terminal 10-($n$−1) receive the measurement data in order in their respective transmission slots and the data processing apparatus 30 receives the measurement data.

Then, last, at time t7 that is included in its transmission slot, the sensor terminal 10-$n$ transmits the measurement data to the data processing apparatus 30 through the access point 40. The data processing apparatus 30 receives the measurement data.

Next, at time t8, the synchronization signal generation apparatus 20 does not transmit the synchronization signal in its transmission slot. In the example in FIG. 7, the synchronization signal generation apparatus 20 transmits synchronization signal one time each time its transmission slot arrives two times. The synchronization signal generation apparatus 20 transmits the synchronization signal at time t3 that is included in its transmission slot, and because of this, does not transmit the synchronization signal at time t8 that is included in its transmission slot that arrives next.

Next, at time t9, the data processing apparatus 30 processes the measurement data that is received at time t5 to time t7, and generates the index information. It is noted that time t9, for example, is included in the transmission slot of the data processing apparatus 30 and that the data processing apparatus 30 may perform one or both of the data processing and the processing that transmits a command or the like, in its transmission slot.

Next, at time t10 that is included in its transmission slot, the sensor terminal 10-1 transmits the measurement data to the data processing apparatus 30 through the access point 40. The data processing apparatus 30 receives the measurement data.

Next, at time t11 that is included in its transmission slot, the sensor terminal 10-2 transmits the measurement data to the data processing apparatus 30 through the access point 40. The data processing apparatus 30 receives the measurement data.

Thereafter, in the same manner, the sensor terminal 10-3 to the sensor terminal 10-($n$−1) receive the measurement data in order in their respective transmission slots and the data processing apparatus 30 receives the measurement data.

Then, last, at time t12 that is included in its transmission slot, the sensor terminal 10-$n$ transmits the measurement data to the data processing apparatus 30 through the access point 40. The data processing apparatus 30 receives the measurement data.

Next, at time t13, the synchronization signal generation apparatus 20 simultaneously transmits synchronization signal to the sensor terminals 10-1 to 10-n and the data processing apparatus 30 through the access point 40. Then, the sensor terminals 10-1 to 10-n and the data processing apparatus 30 receive the synchronization signal. At this point, because the synchronization determination duration ends, the sensor terminals 10-1 to 10-n do not perform the synchronization determination processing.

Next, at time t14, the data processing apparatus 30 processes the measurement data that is received at time t5 to time t7 or time t10 to time t12, and generates the index information. It is noted that time t14, for example, is included in the transmission slot of the data processing apparatus 30 and that the data processing apparatus 30 may perform one or both of the data processing and the processing that transmits a command or the like, in its transmission slot.

Thereafter, the sensor terminals 10-1 to 10-n, the synchronization signal generation apparatus 20, and the data processing apparatus 30 repeat the same operation. Then, the sensor terminals 10-1 to 10-n perform the synchronization determination processing each time the synchronization determination duration comes. For example, the synchronization determination duration comes at an interval of approximately 10 minutes, and at time t20 that is included in the next synchronization determination duration, the synchronization signal generation apparatus 20 simultaneously transmits the synchronization signal to the sensor terminals 10-1 to 10-n and the data processing apparatus 30 through the access point 40. Then, in time t21, the sensor terminals 10-1 to 10-n perform the synchronization determination processing and determines that the synchronization is established.

4. Flowchart

Figure 8:
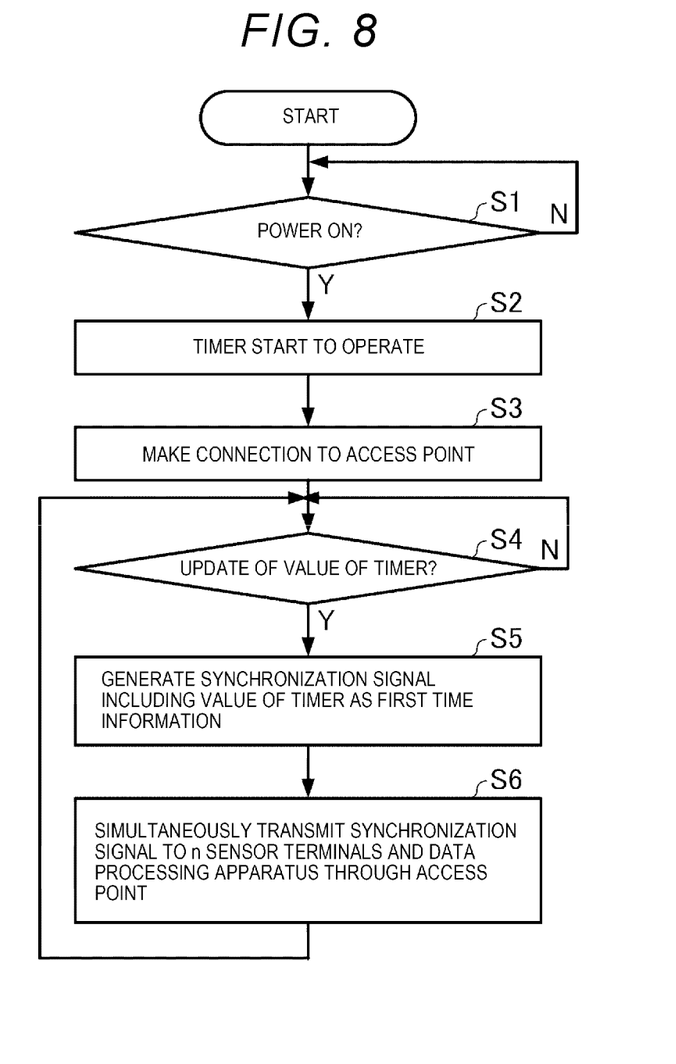
FIG. 8 is a flowchart illustrating an example of a procedure for the operation of the synchronization signal generation apparatus.

FIG. 8 is a flowchart illustrating an example of a procedure for the operation of the synchronization signal generation apparatus 20. In the flowchart that is illustrated in FIG. 8, the order of steps may be changed or a step may be added.

In an example in FIG. 8, when the synchronization signal generation apparatus 20 is powered on (Y in Step S1), first, the timer 22 starts to operate (Step S2).

Next, the synchronization signal generation apparatus 20 makes a connection to the access point 40 (Step S3).

Next, the synchronization signal generation apparatus 20 waits until an update of the value of the timer 22 is made (N in Step S4), and, when the update of the value of the timer 22 is made (Y in Step S4), generates the synchronization signal, as the first time information, that includes the value of the timer 22 (Step S5).

Next, the synchronization signal generation apparatus 20 simultaneously transmits the synchronization signal, which is generated in Step S5, to then sensor terminals 10 and the data processing apparatus 30 through the access point 40 (Step S6).

Thereafter, the synchronization signal generation apparatus 20 repeatedly performs processing operations in Step S4 and subsequent steps.

Figure 9:
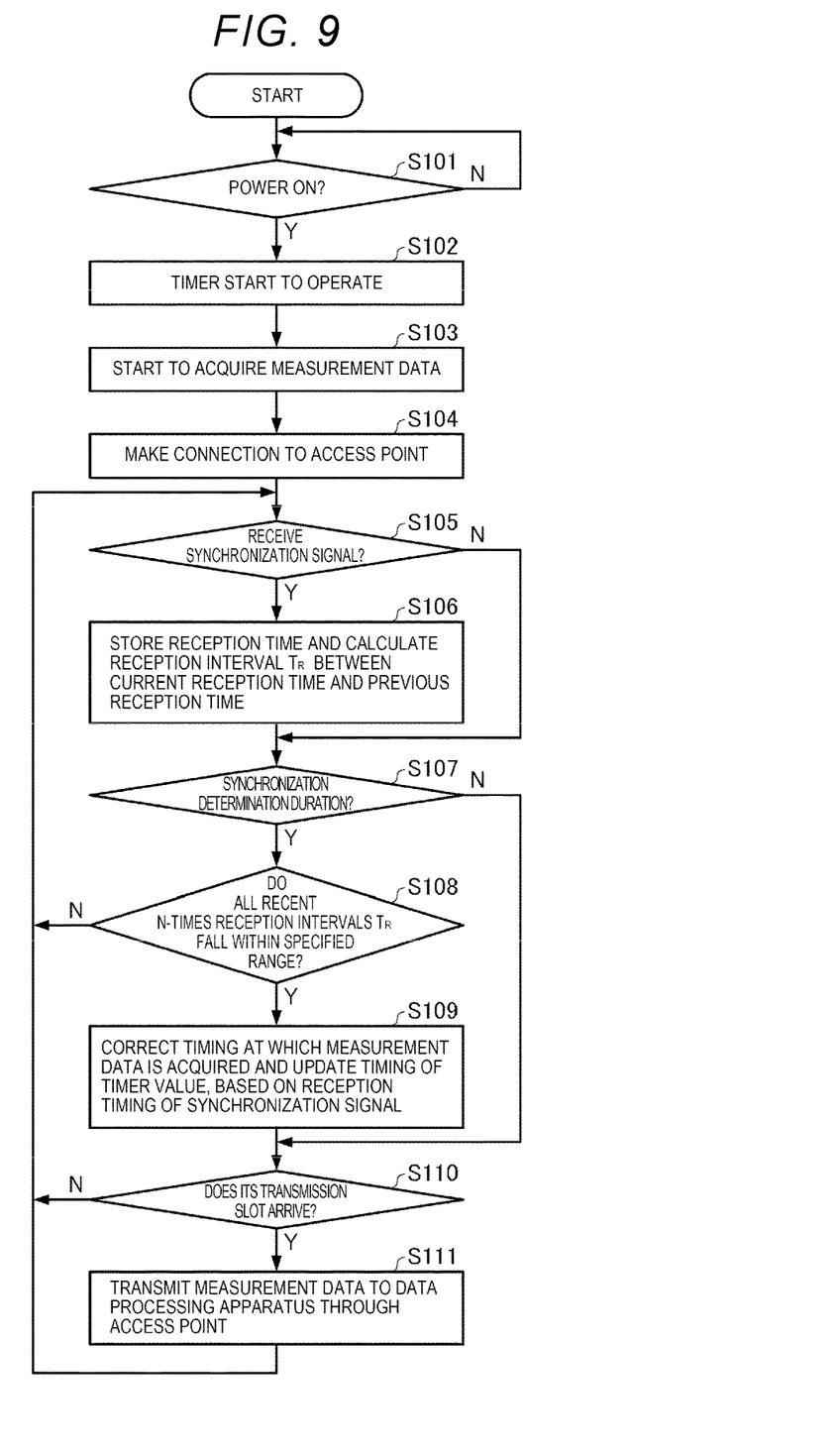
FIG. 9 is a flowchart illustrating an example of a procedure for operation of the sensor terminal.

FIG. 9 is a flowchart illustrating an example of a procedure for operation of the sensor terminal 10. In the flowchart that is illustrated in FIG. 9, the order of steps may be suitably changed or a step may be suitably added.

In the example in FIG. 9, when the sensor terminal 10 is powered on (Y in Step S101), first, the timer 18 starts to operate (Step S102).

Next, the sensor terminal 10 starts to acquire the measurement data (Step S103).

Next, the sensor terminal 10 makes a connection to the access point 40 (Step S104).

Next, when the synchronization signal is received (Y in Step S105), the sensor terminal 10 stores a time at which the synchronization signal is received and calculates a reception interval $T_R$ between a current reception time and a previous reception time (Step S106). In a case where the synchronization signal is not received (N in Step S105), the sensor terminal 10 does not perform the processing in Step S106.

Next, when the synchronization determination duration comes (Y in Step S107), the sensor terminal 10 determines whether or not all the recent N-times reception intervals $T_R$ fall within the specified range (Step S108). In a case where all the recent N-times reception intervals $T_R$ fall within the specified range (Y in Step S108), the sensor terminal ends the synchronization determination duration, and corrects the timing at which the measurement data is acquired and the update timing of the timer value, based on the reception timing of the synchronization signal (Step S109). Furthermore, when at least one of the recent N-times reception intervals $T_R$ does not fall within the specified range (N in Step S108), the synchronization determination duration continues and the sensor terminal 10 re-performs processing operations in Step S105 and subsequent steps.

In a case where the synchronization determination duration does not come (N in Step S107), the sensor terminal 10 performs processing in each of Step S108 and Step S109.

Next, the sensor terminal 10 determines whether or not its transmission slot comes (Step S110), and, when its transmission slot comes (Y in Step S110), transmits the measurement data to the data processing apparatus 30 through the access point 40 (Step S111). In a case where its transmission slot does not come (N in Step S110), the sensor terminal 10 does not perform processing in Step S111.

Thereafter, the sensor terminal 10 repeatedly performs processing operations in Step S105 and subsequent steps.

Figure 10:
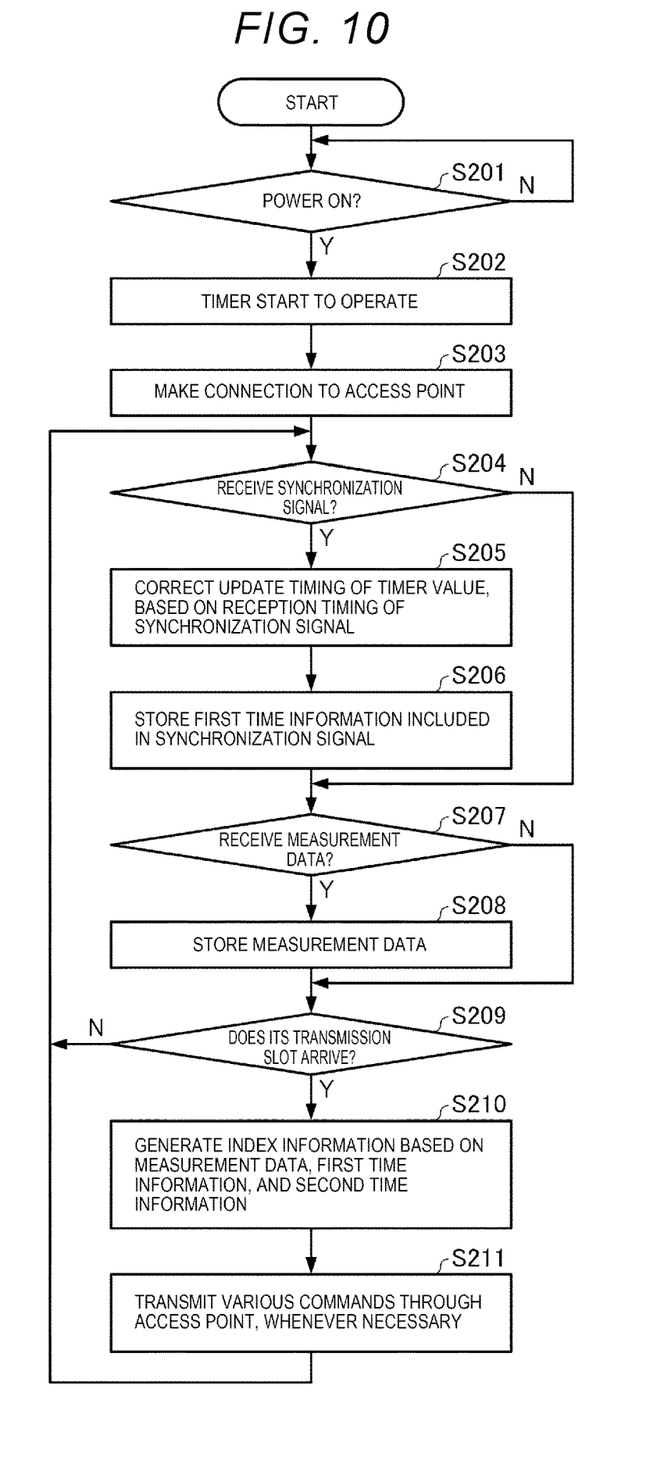
FIG. 10 is a flowchart illustrating an example of a procedure for the operation of the data processing apparatus.

FIG. 10 is a flowchart illustrating an example of a procedure for the operation of the data processing apparatus 30. In the flowchart that is illustrated in FIG. 10, the order of steps may be suitably changed or a step may be suitably added. It is noted that a step in which processing in which the data processing apparatus 30 acquires the second time information from the time server 60 or processing in which the index information is transmitted to the data collection apparatus is performed is omitted from the flowchart that is illustrated in FIG. 10.

In the example that is illustrated in FIG. 10, when the data processing apparatus 30 is powered on (Y in Step S201), first, the timer 32 starts to operate (Step S202).

Next, the data processing apparatus 30 makes a connection to the access point 40 (Step S203).

Next, when the synchronization signal is received (Y in Step S204), the data processing apparatus 30 corrects the update timing of the timer value, based on the reception timing of the synchronization signal (Step S205). Moreover, the data processing apparatus 30 stores the first time information that is included in the synchronization signal (Step S206). In a case where the synchronization signal is not received (N in Step S204), the data processing apparatus 30 does not perform processing operations in Step S205 and Step S206.

Next, when the measurement data is received (Y in Step S207), the data processing apparatus 30 stores the received measurement data (Step S208). In a case where the measurement data is not received (N in Step S207), the data processing apparatus 30 does not perform processing in Step S208.

Next, the data processing apparatus 30 determines whether or not its transmission slot arrives (Step S209), and, when its transmission slot arrives (Y in Step S209), generates the index information, based on the measurement data that is stored in Step S208, the first time information that is stored in Step S206, and the second time information that is acquired from the time server 60 (Step S210). Furthermore, the data processing apparatus 30 transmits various commands through the access point 40, whenever necessary (Step S211). In a case where its transmission slot does not arrive (N in Step S209), the data processing apparatus 30 does not perform processing in each of Step S210 and Step S211.

Thereafter, the data processing apparatus 30 repeatedly performs processing operations in Step S204 and subsequent steps.

5. Effects

In the sensor data processing system 1 according to the present embodiment, the synchronization signal generation apparatus 20 simultaneously transmits the synchronization signal in a wireless manner to multiple sensor terminals 10 through the access point 40, and after the synchronization that is based on the synchronization signal is established, each of the multiple sensor terminals 10 transmits the measurement data in a wireless manner to the data processing apparatus 30 through the access point 40. Furthermore, each of the multiple sensor terminals 10 transmits the measurement data to the data processing apparatus 30 during the communication duration that is allocated in a mutually exclusive manner. Therefore, the measurement data that is transmitted by each sensor terminal 10 does not collide with the synchronization signal or the measurement data that is transmitted by any other sensor terminal 10. In this manner, in the sensor data processing system. 1 according to the present embodiment, the transmission and reception of the synchronization signal and the transmission and reception of the measurement data are performed in a time-division manner through the common access point 40, and because of this, the transmission and reception of the measurement data and the transmission and reception of the synchronization signal can be performed in a single wireless communication scheme. Therefore, with the sensor data processing system 1 according to the present embodiment, a communication scheme dedicated for time synchronization is not necessary separately from a communication scheme dedicated for the transmission and reception of the measurement data, and because of this, the cost for the time synchronization of multiple sensor terminals 10 can be reduced.

Furthermore, in the sensor data processing system 1 according to the present embodiment, the synchronization signal generation apparatus 20 simultaneously transmits the synchronization signal to multiple sensor terminals 10 through the access point 40, and because of this, differences among the timings at which the multiple sensor terminals 10 receive the synchronization signals decrease considerably small. Then, in the sensor data processing system 1 according to the present embodiment, each of the multiple sensor terminals 10 corrects the timing at which the measurement data is acquired, based on the timing at which the synchronization signal is received, and because of this, the differences among the timings at which the multiple sensor terminals 10 receive the synchronization signals decrease considerably small and thus the time synchronization can be realized with higher accuracy.

Furthermore, in the sensor data processing system 1 according to the present embodiment, the synchronization signal generation apparatus 20 also transmits the synchronization signal, which includes the first time information in compliance with the first time standard, to the data processing apparatus 30, and the data processing apparatus 30 converts the time at which the measurement data is acquired, into the time in compliance with the second time standard, based on the first time information and the second time information in compliance with the second time standard, which is acquired from the time server 60, and generates the index information. Therefore, for example, an arithmetic operation apparatus that receives the index information performs arithmetic operation processing of various pieces of information in compliance with the second time standard, which is obtained in a system that is different from the sensor data processing system 1, and of the index information, without the timing conversion, and because of this, the load on the arithmetic operation apparatus can be reduced.

Furthermore, in the sensor data processing system 1 according to the present embodiment, the synchronization signal generation apparatus 20 transmits the synchronization signal multiple times with a fixed periodicity to multiple sensor terminals 10 through the access point 40, and, when the reception interval $T_R$ of the synchronization signal falls successively multiple times within the specified range, each of the sensor terminals 10 determines that the synchronization signal is established. Accordingly, when high delay occurs in the access point 40, the timing at which the synchronization signal generation apparatus 20 transmits the synchronization signal and the timing at which each of the multiple sensor terminals 10 receives the synchronization signal are greatly shifted, but the synchronization is not established in each of the multiple sensor terminals 10. Because of this, the timing at which the measurement data is acquired in each of the multiple sensor terminals 10 is not corrected to an erroneous timing. Therefore, with the sensor data processing system 1 according to the present embodiment, the high-accuracy measurement data can be obtained.

Furthermore, in the sensor data processing system 1 according to the present embodiment, each of the multiple sensor terminals 10 has the inertial sensor 15, and thus the measurement data that includes information on acceleration or angular velocity can be transmitted to the data processing apparatus 30. The data processing apparatus 30 can obtain the amount of displacement by performing two-step integration of acceleration, and a distortion angle can be obtained by performing one-step integration of angular velocity. Therefore, based on the measurement data that is received by multiple sensor terminals 10, the data processing apparatus 30 can calculate an amount of displacement, an amount of twist, the degree of swing, and like that occur in a structure.

6. Modification Example

In the embodiment described above, when the reception interval $T_R$ of the synchronization signal falls successive three times with the specified range, the example is given where the sensor terminal 10 determines that the synchronization is established, but when the reception terminal $T_R$ of the synchronization signal falls successively two times or four or more times within the specified range, the sensor terminal 10 may determine that the synchronization is established.

Furthermore, in the embodiment described above, the example is given where the sensor terminal 10 is installed in the electricity transmission steel tower, but the structure to which the sensor terminal 10, for example, may be a building, a wind power generator, an electric bulletin board along a road, or the like without being limited to the electricity transmission steel tower.

Furthermore, in the embodiment described above, the sensor terminal 10 includes the inertial sensor 15, but no limitation to this is imposed. The sensor that is included in the sensor terminal 10 may be a geomagnetic sensor, an inclination sensor, an atmospheric sensor, a temperature sensor, a moisture sensor, a luminance sensor, an ultraviolet sensor, a rainfall sensor, a water level sensor, a soil water sensor, or the like.

The present disclosure is not limited to the present embodiment and various modifications thereto are possibly implemented within the scope that does not depart from the gist of the present disclosure.

The embodiments and the modification examples, which are described above, are examples, and the present disclosure is not limited to these. For example, suitable combinations of the embodiments and the modification examples are also possible.

The present disclosure includes substantially a configuration that is substantially the same as the configuration described in the embodiment, for example, a configuration that the same function, the same way, and the same result or a configuration that has the same object and the same effect. Furthermore, the present disclosure includes a configuration that results from replacing an unsubstantial portion of the configuration that is described in the embodiment. Furthermore, the present disclosure includes a configuration that achieves the same operational effect as the configuration that is described in the embodiment, or a configuration that can accomplish the same object.

Furthermore, the present disclosure includes a configuration that results from applying a known technology to the configuration that is described in the embodiment.

What is claimed is:

1. A sensor data processing system comprising:
   a plurality of sensor terminals, each including a sensor that outputs measurement data;
   a single access point that is in wireless communication with each of the plurality of sensor terminals, the single access point being configured to wirelessly communicate with different ones of the plurality of sensor terminals, each of the plurality of sensor terminals being in communication with the same single access point wirelessly;
   a data processing apparatus that is in wireless communication with the single access point, receives the measurement data in a wireless manner from the plurality of sensor terminals through the single access point and performs processing on the measurement data; and
   a synchronization signal generation apparatus that is in wireless communication with the single access point and that simultaneously transmits a synchronization signal in a wireless manner both to the plurality of sensor terminals and the data processing apparatus through the single access point,
   wherein, after synchronization that is based on the synchronization signal being established, each of the plurality of sensor terminals transmits the measurement data in a wireless manner to the data processing apparatus through the single access point during a communication duration that is allocated in a mutually exclusive manner.

2. The sensor data processing system according to claim 1, wherein each of the plurality of sensor terminals transmits the measurement data to which an acquisition time is added, to the data processing apparatus during the communication duration.

3. The sensor data processing system according to claim 2,
   wherein the synchronization signal includes first time information in compliance with a first time standard, and
   wherein the data processing apparatus acquires second time information in compliance with a second time standard from a time server through a communication network, and, based on the first time information and the second time information, converts a time at which the measurement data is acquired, into a time in compliance with the second time standard.

4. The sensor data processing system according to claim 1,
   wherein the synchronization signal generation apparatus transmits the synchronization signal multiple times with a fixed periodicity to the plurality of sensor terminals, and when a reception interval of the synchronization signal falls successively multiple times within a specified range, each of the plurality of sensor terminals determines that the synchronization is established.

5. The sensor data processing system according to claim 1, wherein each of the plurality of sensor terminals (1) includes a data acquisition section that acquires the measurement data from the respective sensor, and (2) corrects a timing at which the data acquisition section acquires the measurement data, based on a timing at which the synchronization signal is received.

6. The sensor data processing system according to claim 1, wherein the sensor is an inertial sensor.

7. A sensor data synchronization system comprising:
   a plurality of sensor terminals, each including a sensor that outputs measurement data;
   a single access point that is in wireless communication with each of the plurality of sensor terminals, the single access point being configured to wirelessly communicate with different ones of the plurality of sensor terminals, each of the plurality of sensor terminals being in communication with the same single access point wirelessly; and
   a synchronization signal generation apparatus that is in wireless communication with the single access point and that simultaneously transmits a synchronization signal in a wireless manner to both the plurality of sensor terminals and a data processing apparatus through the single access point,
   wherein, after synchronization that is based on the synchronization signal being established, each of the plurality of sensor terminals transmits the measurement data in a wireless manner to the data processing apparatus through the single access point during a communication duration that is allocated in a mutually exclusive manner, and
   the data processing apparatus is in wireless communication with the single access point, receives the measurement data in a wireless manner from the plurality of sensor terminals through the single access point and performs processing on the measurement data.

8. The sensor data synchronization system according to claim 7,
wherein the synchronization signal generation apparatus transmits the synchronization signal multiple times with a fixed periodicity to the plurality of sensor terminals, and when a reception interval of the synchronization signal falls successively multiple times within a specified range, each of the plurality of sensor terminals determines that the synchronization is established.

9. The sensor data synchronization system according to claim 7, wherein the sensor is an inertial sensor.

* * * * *